United States Patent [19]
Hanlon et al.

[11] Patent Number: 5,944,594
[45] Date of Patent: Aug. 31, 1999

[54] APPARATUS AND METHOD FOR FORMING SAUSAGE LINKS

[75] Inventors: Allan James Hanlon, Stirlingshire; Tom Saddler Lynch, Glasgow; Derek Samuel David Norwood, Ayrshire, all of United Kingdom; Frederikus Johannes Brink, Veenendaal; Jan Schipper, Barneveld, both of Netherlands

[73] Assignee: Devro PLC, United Kingdom

[21] Appl. No.: 09/183,424

[22] Filed: Oct. 30, 1998

Related U.S. Application Data

[62] Division of application No. 08/535,133, filed as application No. PCT/GB94/00794, Apr. 15, 1994, Pat. No. 5,833,525.

[30] Foreign Application Priority Data

Apr. 15, 1993 [GB] United Kingdom .................. 9307773

[51] Int. Cl.[6] .................................................. A22C 15/00
[52] U.S. Cl. ............................................ 452/51; 452/177
[58] Field of Search .............................. 452/51, 186, 185, 452/177

[56] References Cited

U.S. PATENT DOCUMENTS

| | | |
|---|---|---|
| 4,091,505 | 5/1978 | Müller et al. ............................. 452/51 |
| 4,547,931 | 10/1985 | Staudenrausch et al. ................ 452/51 |
| 4,682,385 | 7/1987 | Kasai et al. ............................... 452/51 |
| 4,761,854 | 8/1988 | Schnell et al. ............................ 452/51 |
| 5,085,612 | 2/1992 | Müller et al. ............................. 452/51 |
| 5,306,204 | 4/1994 | Smith et al. .............................. 452/51 |
| 5,354,229 | 10/1994 | Markwardt et al. ...................... 452/51 |
| 5,354,230 | 10/1994 | McFarlane et al. ...................... 452/51 |

Primary Examiner—Willis Little
Attorney, Agent, or Firm—Gifford, Krass, Groh, Sprinkle, Anderson & Citkowski, P.C.

[57] ABSTRACT

Apparatus for forming a chain of sausage links is described in which the formed links are less likely to unwind. The apparatus includes a conveyor (10) for moving a tubular food casing (18) filled with a food emulsion around an axis (12), the conveyor having a plurality of crimping (14a–h) and twisting (15a–h) means for forming a continuous adjacent links. The conveyor (10) moves the links through a semicircular path past station (A–I) where twisting and crimping operations are performed. The links so formed have a first set twisted in one direction about the tubular food casing axis and a second set of adjacent links twisted in the opposite direction. The twisted links are then fed to apparatus (90) for arranging the twisted sets of links in vertical hanging loops (91) using a screw thread (104) of variable decreasing pitch with clamps (96) for clamping between the oppositely twisted sets of links so that as the twisted links move along the screw thread (104), oppositely twisted sets of links form hanging loops which have little tendency to unwind.

9 Claims, 9 Drawing Sheets

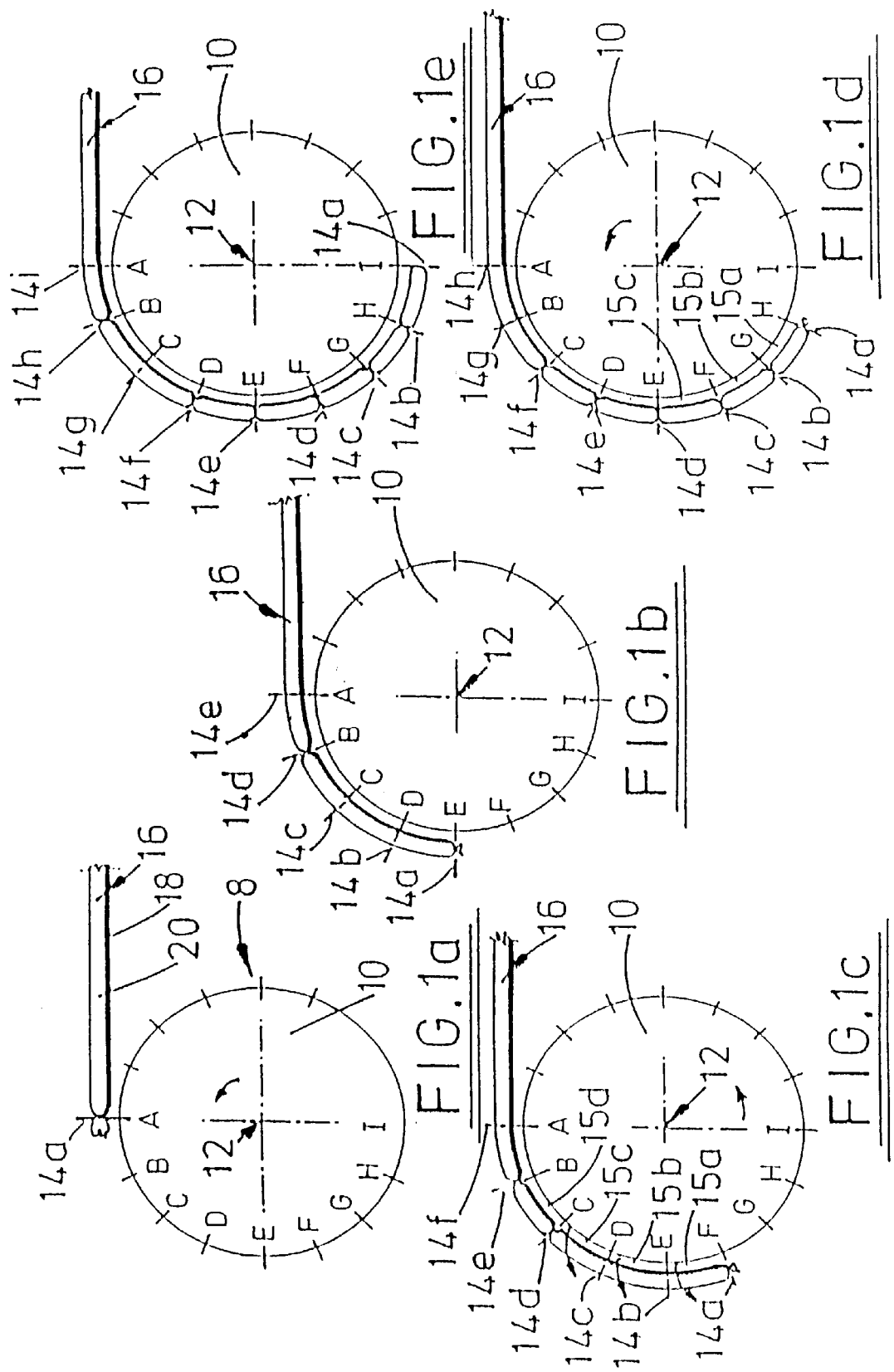

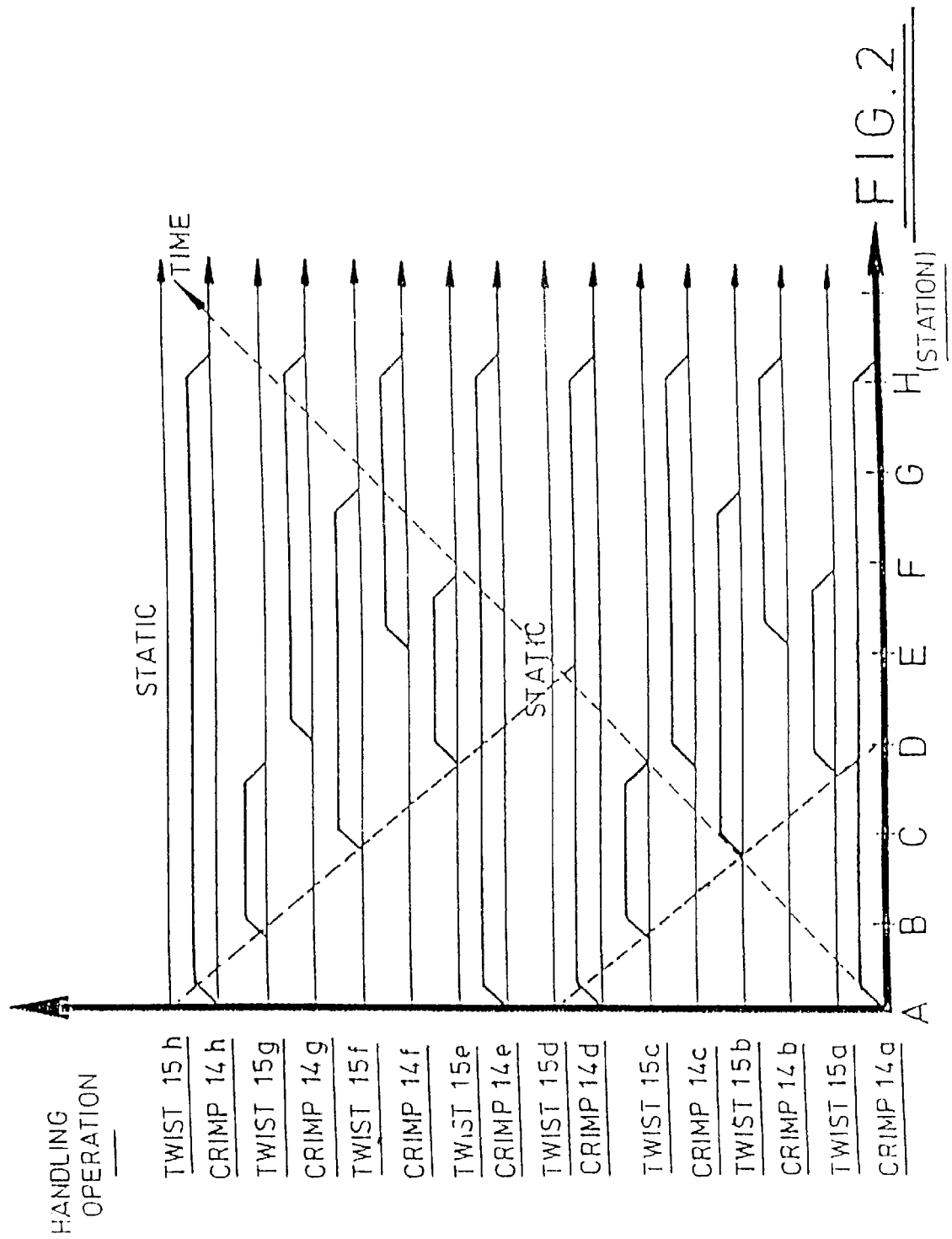

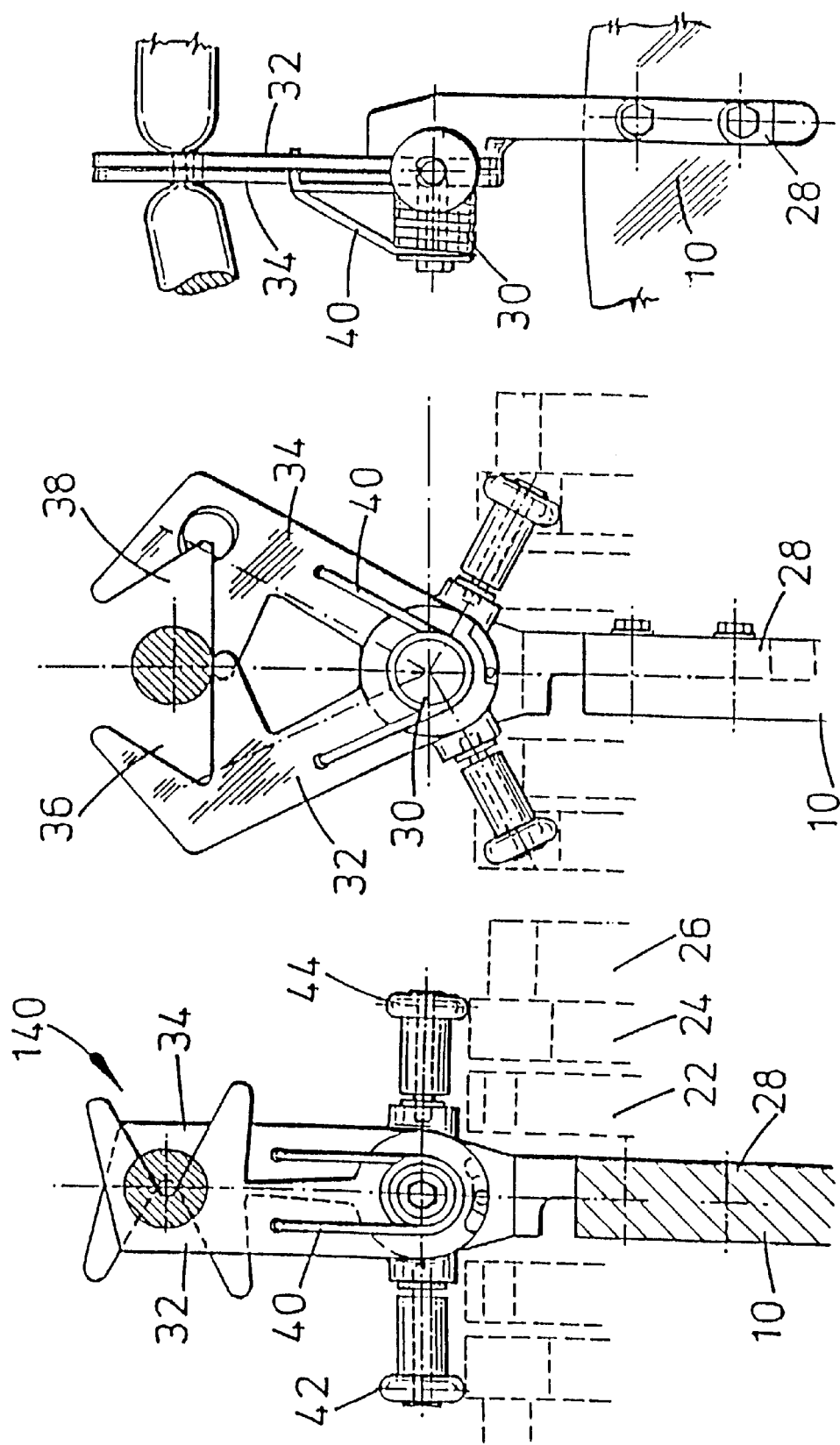

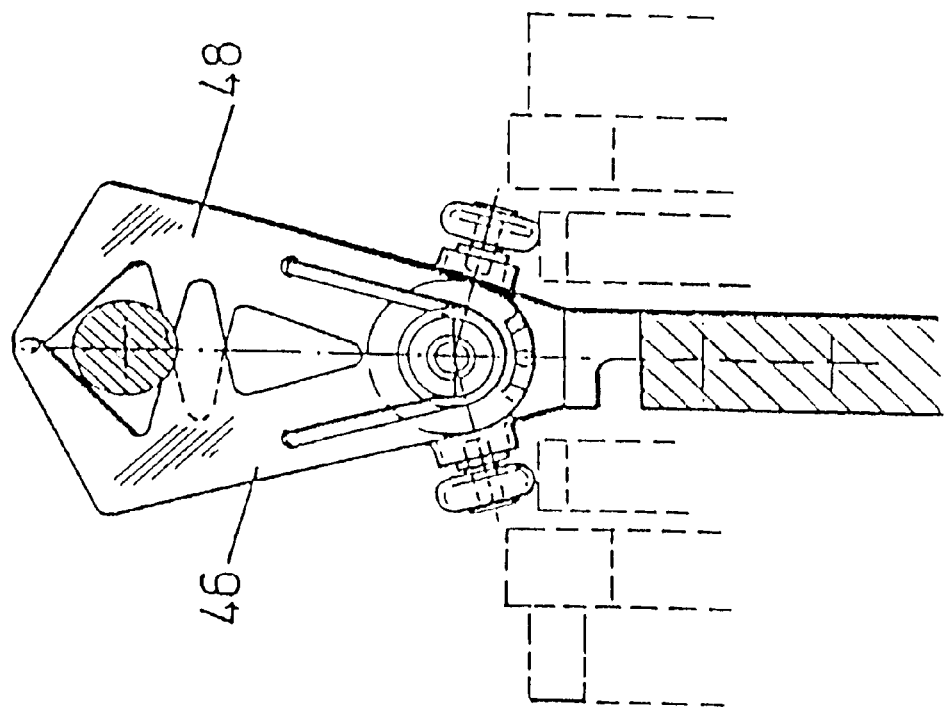
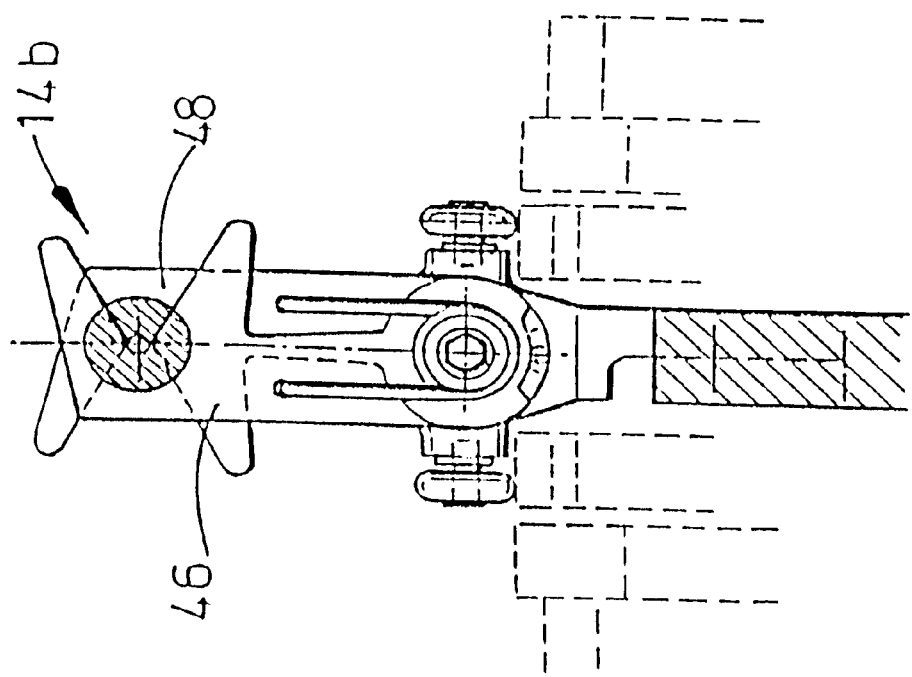

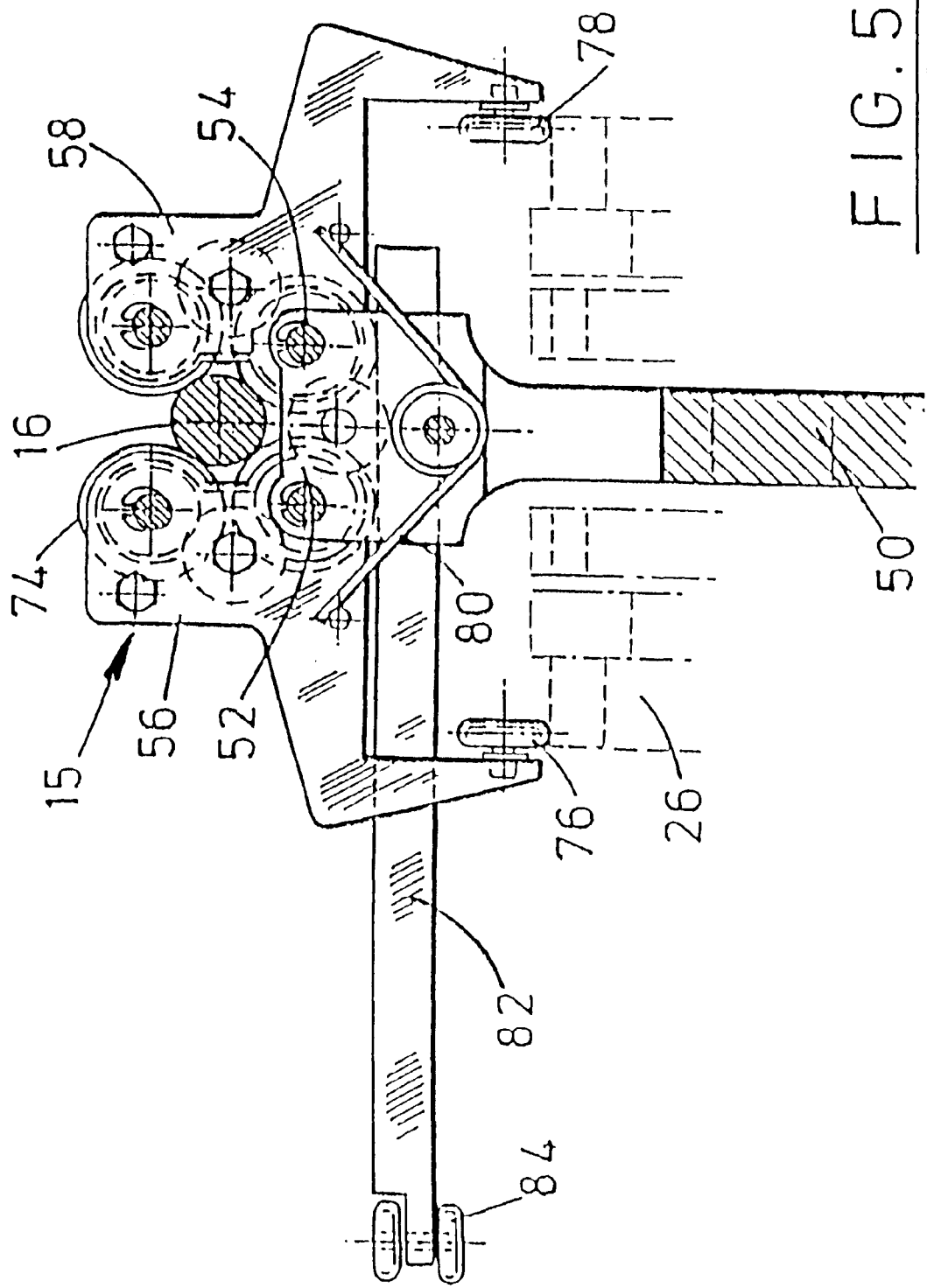

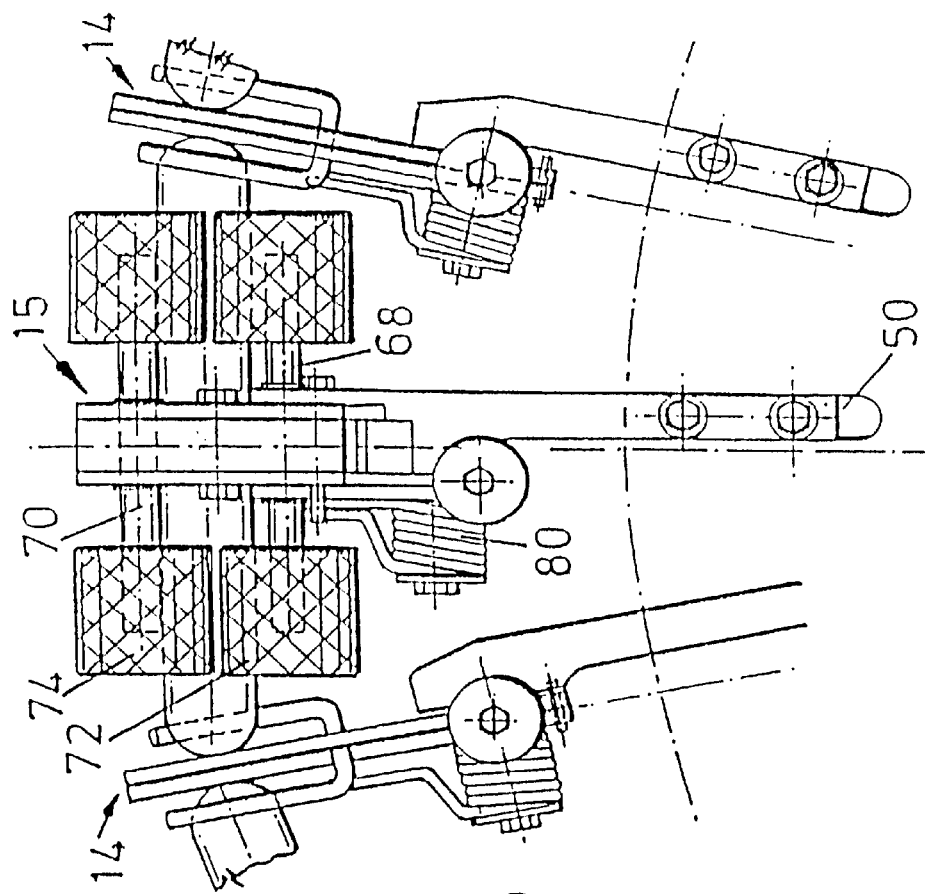
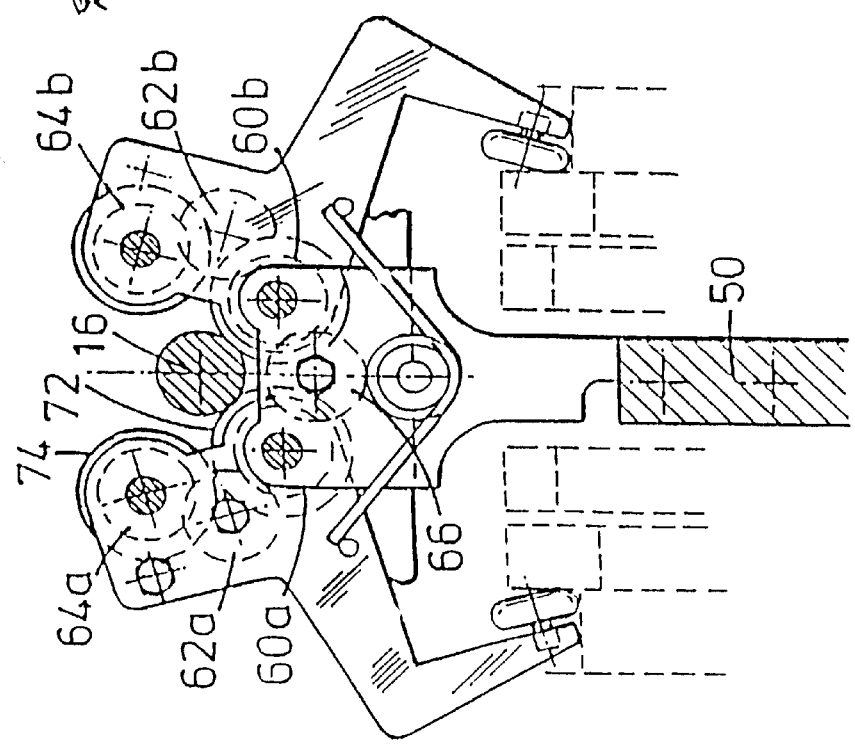

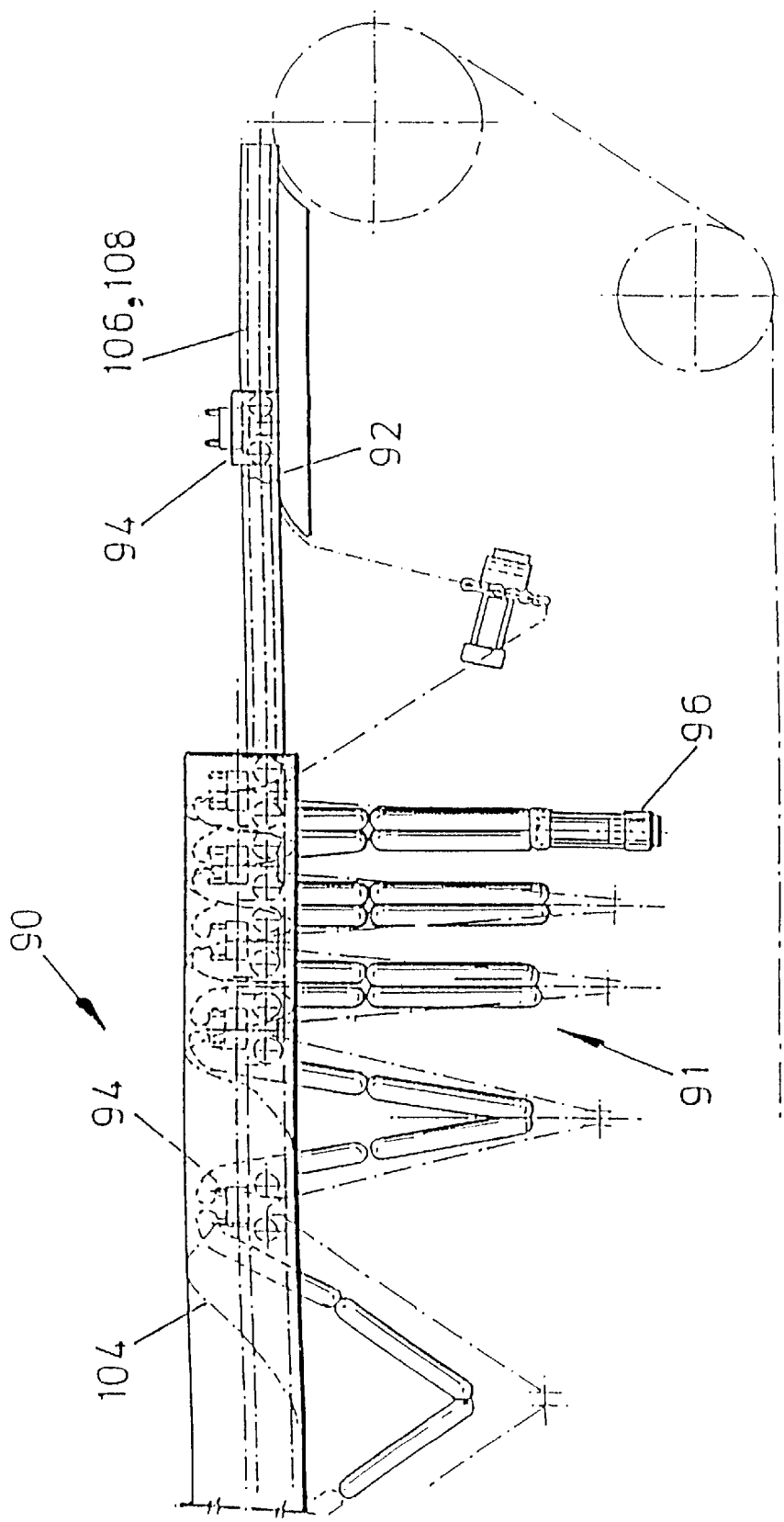

APPARATUS AND METHOD FOR FORMING SAUSAGE LINKS

CROSS REFERENCES TO RELATED APPLICATIONS

This application is a divisional application based on U.S. Ser. No. 08/535,133, filed Feb. 12, 1996 now U.S. Pat. No. 5,833,525 which is a 371 of PCT/GB94/00794 filed Apr. 15, 1994.

FIELD OF THE INVENTION

This invention relates to an apparatus and a method for forming a chain of sausage links from a tubular casing filled with a food emulsion, and further to a chain of sausage links produced by the apparatus and method of the invention. The invention also relates to an apparatus for arranging a longitudinal chain of sausage links in hanging loops.

DESCRIPTION OF THE RELEVANT PRIOR ART

Sausage links are produced by pinching and/or twisting a tubular casing filled with a food emulsion. The casing may either be extruded with the emulsion or a preformed casing may be filled with emulsion. Individual sausages may be formed using a method and apparatus such as described in European Patent Nos. 69544 and 139333. In the disclosed apparatus a number of forming arms are radially mounted on a circular plate and are capable of being moved into an open or closed position as they are rotated around a stationary shaft upon which is mounted a pair of cams. There are cam followers associated with each of the forming arms to move the forming arms to open and close in a manner determined by the shape of the cam. Stuffed sausage casing is fed tangentially to the apparatus and is received into the space defined by a pair of open forming arms and, as the forming arms are carried around the centre line of the plate, the cams force the forming arms together forming individual sausage links. Once a sausage is formed, the cam is shaped to move the arms closer together to sever the casing between the individual sausages.

If it is desired to form a chain of sausage links it is preferable that adjacent links are rotated about their longitudinal axis relative to one another to form twisted casing portions between the links and thus better maintain the integrity of the individual links. Sausage linking apparatus suitable for this purpose is manufactured by Famco, the Famco sausage linkers incorporating splined rollers or belts which produce the twist between the links by turning adjacent links in opposite directions. The roller mechanism and the pincher assemblies, which hold the sausage and form the link shapes, are both attached to a continuous roller chain. The roller mechanism engages a horizontal rack and is driven by the movement of the chain along the rack.

The chain of sausage links produced using the Famco apparatus is generally sufficient for producing links which will, for example, be laid out in a shallow tray for storage and sale, as the friction between the tray surface and between adjacent links prevents the links from untwisting. However, if the links are to be cured or smoked, for example, the links are typically hung in loops; in this arrangement, the twisted casing portions between the links tend to unwind resulting in the integrity of the individual links being lost.

SUMMARY OF THE INVENTION

One of the objects of the present invention is to provide a method and an apparatus for forming a chain of sausage links which is less likely to unwind.

According to the present invention there is provided an apparatus for forming a chain of sausage links from a tubular casing filled with a food emulsion, the apparatus comprising conveyor means including a plurality of pinching means for closing on the casing to form individual links and a plurality of twisting means for rotating the filled casing about a longitudinal axis relative to adjacent links to form twisted casing portions between the links, characterised in that the twisting means are arranged to rotate a first set of a plurality of adjacent links in one direction and a following second set of adjacent links in an opposite direction.

According to a further aspect of the present invention there is provided a method of forming a chain of sausage links from a tubular casing filled with a food emulsion, the method comprising the steps of: pinching the casing at spaced intervals to form individual links; and rotating the filled casing about a longitudinal axis relative to adjacent links to form twisted casing portions between the links, characterised in that a first set of a plurality of adjacent links is rotated in one direction and a following second set of adjacent links is rotated in an opposite direction.

These aspects of the present invention allow production of a chain of sausage links which is less likely to unwind than the chains produced with conventional apparatus and methods, particularly where the chain is to be hung in loops, following forming, for unloading or further processing such as freezing, curing, smoking, cooking and the like. Conveniently, sets of even numbers of adjacent links, preferably four, will be twisted in alternate directions, to facilitate hanging of the chain in loops.

Preferably, the conveyor means defines a continuous path and most preferably, for compactness, defines a circular path, the pinching and twisting operations preferably being completed on movement of the conveyor means through 180 degrees.

Most preferably, the pinching means are in the form of pinching arms arranged to open and close to receive, pinch and then release a portion of filled casing. The arms may include cam followers which cooperate with cams configured to provide a desired arm configuration at an appropriate point on the path followed by the conveyor means. A plurality of cams of different profile may be provided and each set of pinching arms may be provided with cam followers arranged to follow a respective cam. This arrangement permits the provision of pinching arms having different opening and closing sequences to suit the different requirements of the twisting operations carried out on the first and second sets of links.

The present invention also relates to a chain of sausage links produced by the apparatus and method described above.

According to a still further aspect of the present invention there is provided apparatus for arranging a longitudinal chain of sausage links in substantially vertical loops, the apparatus comprising a conveyor means including a plurality of support means arranged at spaced locations to receive the chain of sausage links at a loading station, the support means being arranged to move closer together as the support means moves from the the loading station such that the lengths of sausage between the supported locations form hanging loops.

This aspect of the present invention may be used to in conjunction with the other aspects of the invention described above or may be used with conventional sausage linkers.

Preferably, the conveyor means includes a screw arrangement for movably mounting the support means, rotation of the screw producing longitudinal movement of the support means. Most preferably, the screw has a thread of variable pitch to effect the variable spacing of the support means.

Preferably also, the conveyor means includes clamp means arranged at spaced locations to clamp portions of the chain of sausages at the loading station to prevent unwinding of links which have been twisted relative to adjacent links. For use with the other aspects of the present invention described above, the clamp means are preferably arranged to clamp adjacent the twisted casing portions between the oppositely twisted sets of links.

Preferably also, the clamp means are located on the conveyor means between the support means. Most preferably, the conveyor means includes a flexible link, such as a chain, and the support means and the clamp means are mounted on the flexible link. It is preferred that the support means and clamp means are arranged such that a clamp means is clamped to the portion of the sausage chain which forms the lower part of each the hanging loops.

These and other aspects of the present invention will now be described, by way of example, with the reference to the accompanying drawings in which:

BRIEF DESCRIPTION OF THE DRAWINGS

FIGS. 1a to 1e illustrate, somewhat schematically, steps of a method of forming a chain of sausage links in accordance with a preferred embodiment of the present invention, carried out on an apparatus in accordance with a preferred embodiment of a further aspect of the present invention;

FIG. 2 is a graph illustrating the timing of the twisting and crimping steps of FIGS. 1a to 1e and the operating conditions of parts of the apparatus of FIGS. 1a to 1e;

FIGS. 3a, 3b and 3c are views of a pinch arm assembly of the apparatus of FIGS. 1a to 1e;

FIGS. 4a and 4b are views of a further pinch arm assembly of the apparatus of FIGS. 1a to 1e;

FIGS. 5a, 5b and 5c are various views of a roller assembly of the apparatus of FIGS. 1a to 1e;

FIGS. 6a and 6b are somewhat schematic views of apparatus for arranging a longitudinal chain of sausage links in substantially vertical loops in accordance with a preferred embodiment of a still further aspect of the present invention;

DETAILED DESCRIPTION OF THE DRAWINGS

Figure 6A:
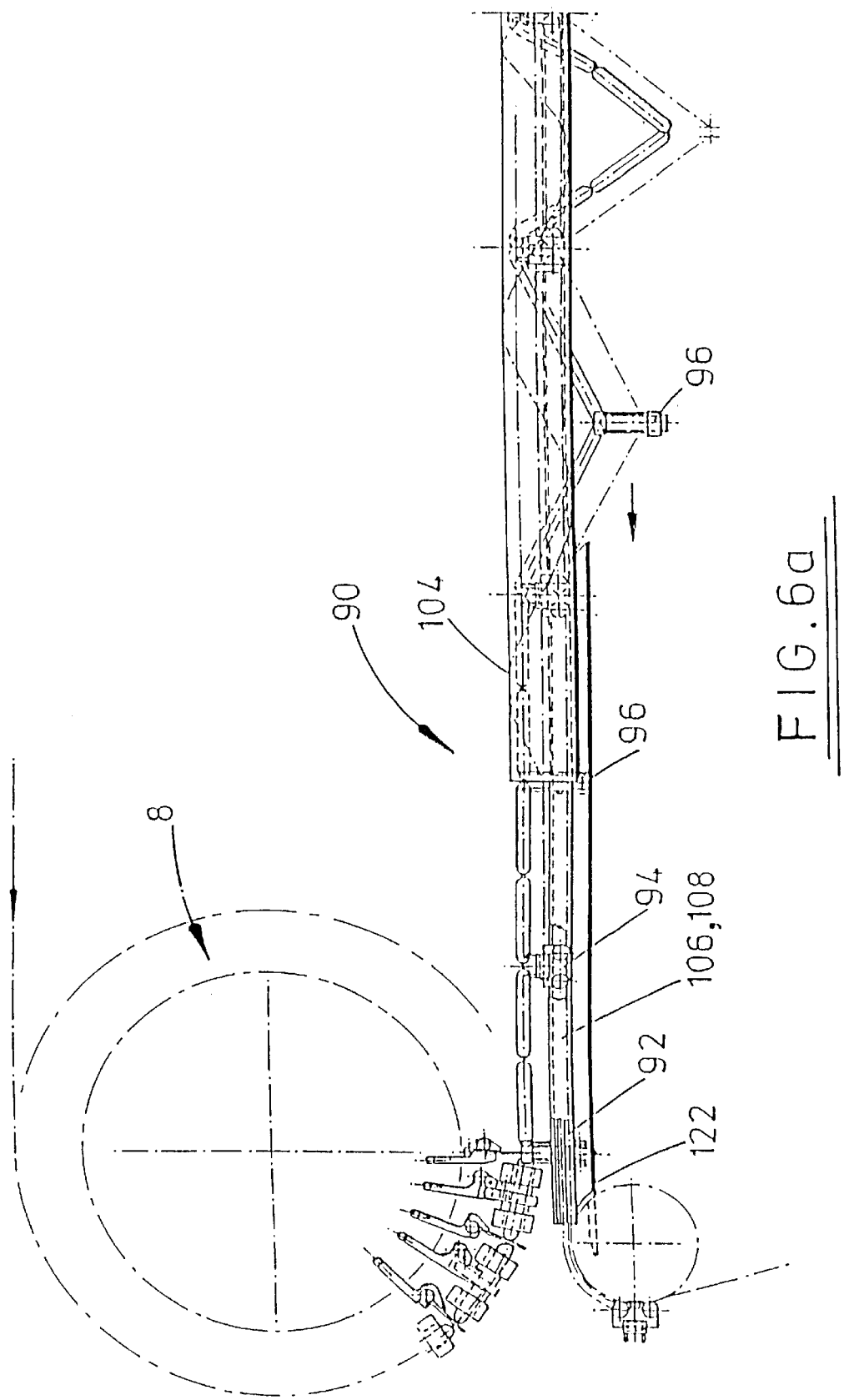

Reference is first made to FIGS. 1a to 1e, which illustrate, somewhat schematically, an apparatus 9 for forming a chain of sausage links. The apparatus includes conveyor means in the form of a mounting plate 10 which is driven to rotate about an axis 12. Mounted radially at the edge of the plate 10 are a plurality of pinching means in the form of pinch arm assemblies 14a–h and twisting means in the form of roller assemblies 15a–h. As will be described, as the plate 10 rotates the pinch arms and rollers are operated to form a rope of sausage into a chain of sausage links. This process will first be described as a series of steps as the plate 10 rotates, with reference to various angularly spaced locations, designated by eight letters A to I. Reference is first made to FIG. 1a, which shows a rope of sausage 16 comprising a tubular casing 18 filled with a food emulsion 20, being presented to the open pinch arms 14a at station A, which then close to pinch the end of the rope. The wheel then rotates with the rope 16 being drawn around the plate 10, into the open pinch arms as they pass station A. From station A, pinch arms 14b and 14c first close completely then only partially to retain but not pinch the rope, while pinch arms 14d immediately close fully onto the sausage 16 on passing station A. On the pinch arms 14a reaching station E, as illustrated in FIG. 1b, the sausage 16 is being received by open pinch arms 14e. On rotation of the plate 10 to bring the pinch arms 14a to station F, as shown in FIG. 1c, the pinch arms 14e have closed fully to pinch the sausage 16 and the roller mechanism 15a, 15b and 15c has been activated to turn the sausage to form twists in the sausage rope at pinch arms 14a and 14d. Following further rotation of the plate 10 to bring the pinch arms 14a to station H, as shown in FIG. 1d, the rollers 15a and 15c have stopped rotating, pinch arms 14b and 14c have closed fully on the sausage 16 while roller 15b continues to rotate forming twists in the casing at pinch arms 14b and 14c. Thus, the first set of four links have all been twisted relative to one another in the same clockwise direction. After rotation to station I, as shown in FIG. 1e, the pinch arms 14a open to release the sausage rope 16 onto a second conveyor (not shown). At this position pinch arms 14e are in the same position as pinch arms 14a were as shown in FIG. 1b, and the second set of four links between pinch arm 14e and 14i are then subject to the same pinching and twisting operations as the four preceding links, but with the sausage rope 16 being rotated in the opposite, clockwise direction.

FIG. 2 of the drawings illustrates a timing graph of the crimping and twisting operations of the pinch arms and roller assemblies at each of the stations A to I of the mounting plate 10. The diagonal bands defined by the chain-dotted lines, along the time axis t, extending upwardly from right to left indicate the condition of each pinch arm and roller assembly with rotation of the plate 10.

Reference is now made to FIGS. 3a, 3b and 3c of the drawings which illustrate the pinch arm assembly 14a. The Figures also illustrate three pairs of cams 22, 24 and 26 which operate the various pinch arm assemblies, the pinch arm assembly 14a being operated by the middle pair of cams 24. The assembly 14a includes a mounting bracket 28 which is fixed to the plate 10. The bracket 28 includes an axle 30 on which a pair of arms 32, 34 are pivotally mounted. The arms 32, 34 define opposing jaws 36, 38 which may be open to receive the rope of sausage 16, as shown in FIG. 3b, or closed to pinch the rope to create an individual link, as shown in FIGS. 3a. The arms 32, 34 are biased to the open position by a spring 40 mounted on the axle 30, the arms being pushed to the closed position by cam followers 42, 44 which ride on the cams 24.

Reference is now made to FIGS. 4a and 4b of the drawings which show the pinch arm assembly 14b which cooperates with the middle inner pair of cams 22 and which has arms 46, 48 which, by virtue of the profile of the cams 22, may be open to receive the rope of sausage 16 at station A, fully closed to pinch the sausage between stations E and H or, as shown in FIG. 4b, partially closed between stations A to E to hold the sausage 16 on the plate 10, without crimping.

From FIG. 2 it can be seen that pinch arms 14a, 14d, 14e and 14h follow the one pair of cams 24, while pinch arm 14b and 14f follow cams 22, and the other arms 14c and 14g follow the outer pair of cams 26.

Reference is now made to FIGS. 5a, 5b and 5c of the drawings, which illustrate one of the roller assemblies 15a. Like the pinch arm assembly 14a, the roller assembly 15a is provided with a mounting bracket 50 for attachment to the plate 10. The bracket 50 provides mounting for a pair of axles 52, 54 on which a pair of arms 56, 58 are pivotally mounted. Each arm 56, 58 provides mounting for three gear wheels 60, 62, 64, a further single gear wheel 66 being mounted on the bracket 50. The gear wheel 66 engages with both gear wheels 60a, 60b, which in turn engage with respective gear wheels 62a, 62b, which in turn engage with gear wheels 64a, 64b. The gears 60a, 60b, 64a, 64b are each provided with long axles 68, 70 which extend beyond the respective arms 56, 58 to provide mounting for pairs of rollers 72. 74.

Each arm 56, 58 of the roller assembly 15a has a cam follower 76, 78 which rides on the outer set of cams 26 to close the assembly against the action of a spring 80 mounted on an axle 82 on the mounting bracket 50. In the closed position, as shown in FIG. 5a, the rollers 72, 74 retain and engage the sausage 16. In the open position, as shown in FIG. 5b, the upper pairs of rollers 74 are separated to allow loading and unloading of the sausage 16.

Rotation of the gear wheel 66, and thus the rollers 72, 74, is effected by movement of a rack 82 mounted in the bracket 50. The outer end of the rack 82 is provided with a cam follower 84 which engages a cam (not shown) mounted adjacent the circumference of the plate. In the illustrated example, movement of the rack 82 to the right produces counter-clockwise twisting of the sausage 16. Twisting of the sausage in the opposite, clockwise direction is achieved by reviewing the rack in the opposite direction i.e. to the left so as to produce clockwise twisting of the sausage.

As mentioned above, the twisted chain of sausages produced by the apparatus 9 is passed from the pinch arms and roller assemblies on the plate 10 to a second conveyor 90, as shown in FIGS. 6a and 6b of the drawings (it will be noted that FIGS. 6a and 6b are drawn to different scales). The conveyor 90 receives the sausage chain as it is unloaded from the plate 10 and then arranges the chain in vertical hanging loops 91, as shown in FIG. 6b. The loops provide a convenient arrangement for manual unloading of the sausages, or for continuous further processing, such as curing.

The conveyor 90 includes a continuous roller chain 92 to which a plurality of supports and clamps 94, 96 are alternately mounted. Each adjacent support and clamp 94, 96 is spaced apart by two link lengths and, to avoid the twisted links unwinding, the clamps 96 are located to engage the chain adjacent the ends of the oppositely twisted sets of links.

Figure 7:
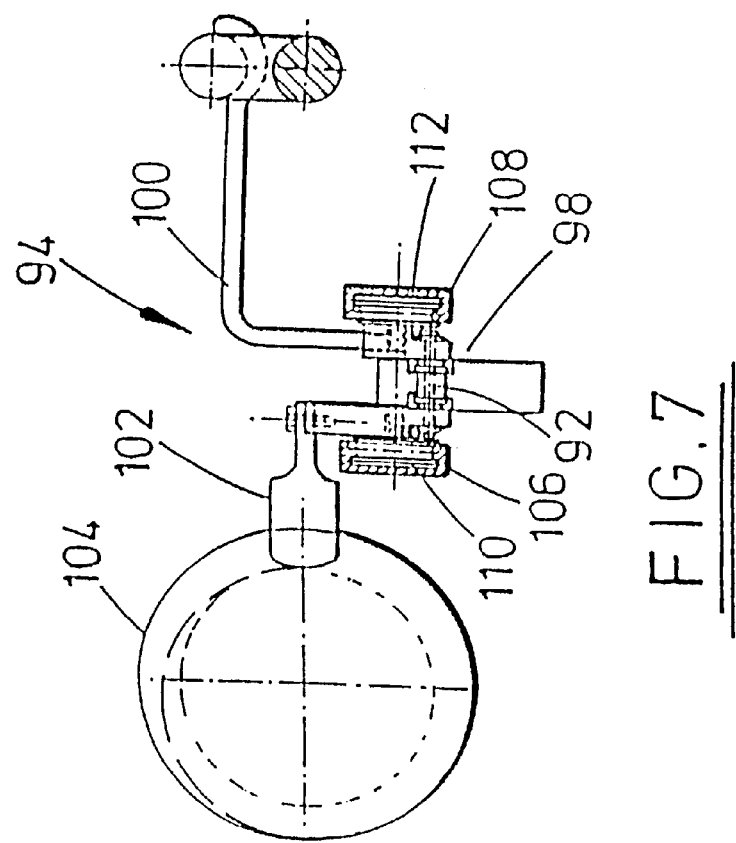
FIG. 7 is a view of a support member of the apparatus of FIGS. 6a and 6b.

Each support 94, one of which is illustrated in FIG. 7 of the drawings, comprises a mounting member 98 for engaging the chain 92, the member 98 providing mounting for a pair of link supporting arms 100 (only one visible in FIG. 7) on one side of the chain 92 and a screw follower 102 on the other side of the chain 92. The follower 102 engages with a screw 104 which extends along the upper reach of the second conveyor path and provides the drive for the chain 92. The upper reach of the conveyor also includes a pair of rails 106, 108 which receive set of wheels 110, 112 mounted on the member 98.

Figure 8:
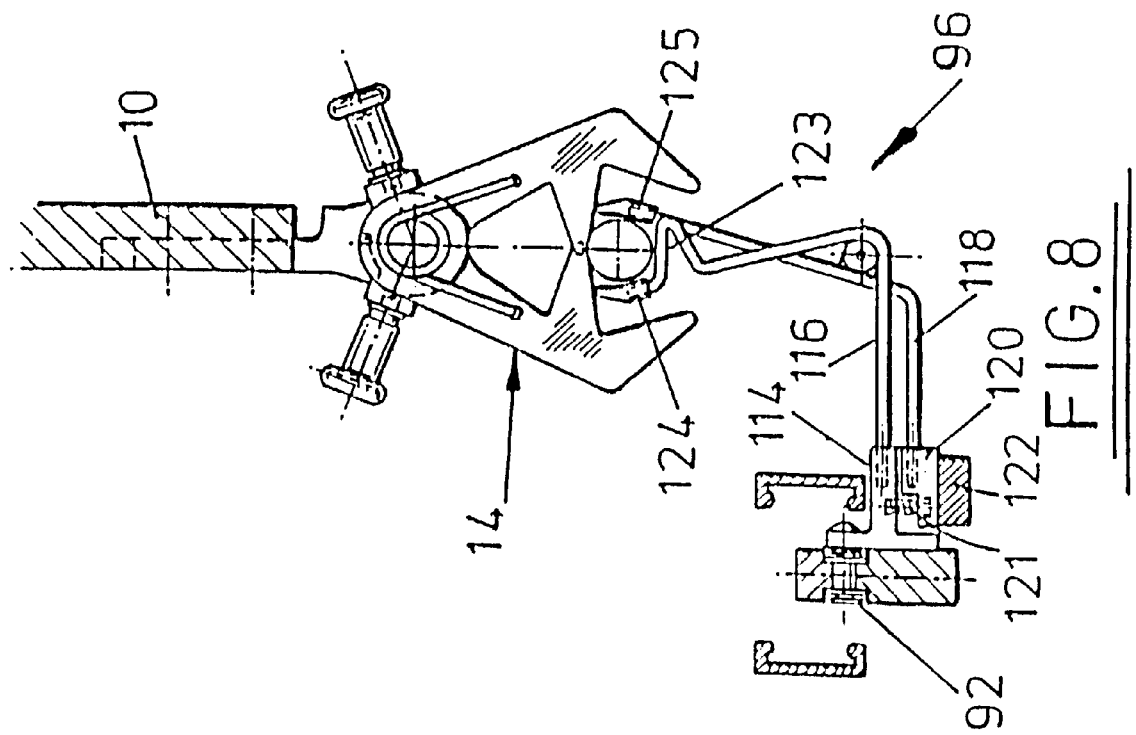
FIG. 8 is a view of a clamp arm assembly of the apparatus of FIGS. 6a and 6b.

Each of the clamps 96, one of which is illustrated in FIG. 8, is supported by the chain 92 and includes a member 114 attached to the chain 92. A wire clamp arm 116 is fixed to the member 114, a second clamp arm 118 being pivotally mounted on the first arm 116. The lower end of the second arm 118 is provided with a block 120 which is biassed away from the opposing face of the member 114 by a spring. The arms 116, 118 are arranged such that the spring 121 biases the arms to a clamping configuration, the arms being opened to allow loading of the chain by the presence of a block deflecting rail 122, provided at the beginning of the upper reach of the conveyor, which forces the block 120 upwardly against the action of the spring 121. It will be noted from FIG. 8 that the first arm 116 includes a horizontal support portion 123, in addition to the clamping portion 124 opposing the clamping portion 125 on the other arm 118.

The pitch of the screw 104 decreases in the direction away from the loading station such that, with the movement from left to right as shown in the drawings, the supports 94 are brought closer together such that the chain 92, and the chain of sausage links between the supports 94, tend to form hanging loops 91, with the clamps 96 at the lower ends of the loops.

As the clamps 96 engage the sausage 16 between the sets of oppositely twisted links the four links between each clamp are unable to unwind, either in the extended position when initially loaded onto the second conveyor, or when arranged as a series of hanging loops.

The hanging loops provide a convenient and compact arrangement for further processing of the sausage, and also facilitate manual unloading of the sausage from the conveyor 90. The clamps 96 are released by passing over a further cam (not shown).

Although the embodiments described above relate to sausage links being handled in oppositely twisted sets of four links it is of course possible to form and handle other combinations of links. The term tubular casing filled with food emulsion would also cover any continuous co-extrusion product, such as collagen or alginate filled with a food emulsion. Further, the person of skill in the art will realise that the particular embodiments described above are merely exemplary of the present invention and that various modifications and improvements may be made to the invention without departing from the scope of the invention: for example, the rollers 72, 74 of the roller assemblies may be replaced with bands or belts; also the mounting plate 10 could be arranged to rotate around a vertical axis.

We claim:

1. Apparatus for arranging a longitudinal chain of sausage links in substantially vertical loops, the apparatus comprising a conveyor means including a plurality of support means arranged at spaced locations to receive the chain of sausage links at a loading station, the support means being arranged to move closer together as the support means moves from the the loading station such that lengths of sausage between the supported locations form hanging loops.

2. Apparatus as claimed in claim 1 characterised in that the conveyor means includes a screw arrangement for movably mounting the support means, rotation of the screw producing longitudinal movement of the support means.

3. Apparatus as claimed in claim 2 characterised in that the screw has a thread of variable pitch to effect variable spacing of the support means.

4. Apparatus as claimed claim 1 characterized in that the conveyor means includes clamp means arranged at spaced locations to clamp portions of the chain of sausages at the loading station to prevent unwinding of links which have been twisted relative to adjacent links by clamping adjacent twisted casing portions between oppositely twisted sets of links.

5. Apparatus as claimed in claim 4 characterized in that the clamp means are located on the conveyor means between the support means.

6. Apparatus as claimed in claim 4 characterized in that the conveyor means includes a flexible link and support means and the clamp means are mounted on the flexible link.

7. Apparatus as claimed in any of claim 4 characterized in that the support means and clamp means are arranged such that a clamp means is clamped to a portion of the chain of sausage links which forms a lower part of each of the hanging loops.

8. Apparatus for hanging a string of sausages in an ordered vertical arrangement of facilitate handling the string of sausages, said apparatus comprising:

generally horizontally disposed conveyor means for receiving a string of sausages at a feeding station and transporting the string of sausages to a sausage removal station, said conveyor means including a plurality of clamping means, each clamping means for clamping between a pair of sausages, and adjacent ones of said plurality of clamping means being spaced apart by an even number of sausages to define a clamped length, said conveyor means including a plurality of support means disposed between adjacent sausage clamping means, said conveyor means including a moveable conveyor carrying said clamping and support means and a screw thread element means having a pitch decreasing in the direction of travel along which said conveyor moves, the arrangement being such that as said conveyor moves along said screw thread element means said conveyor slackens and said sausages become oriented in linked generally vertical lengths equal to half the clamped length, the clamps being at the lowermost points of said vertical lengths.

9. A method of hanging continuously linked sausages vertically in predetermined lengths, said method comprising the steps of, transporting said continuously linked sausages on a conveyor in a generally horizontal direction, clamping said sausages a predetermined distance apart corresponding to twice said predetermined length by clamps coupled to said conveyor, supporting the sausages at a location between said clamping locations by supports coupled to said conveyor, the distance between said support location and said clamping locations corresponding to said predetermined lengths, gradually slackening the conveyor by causing it to move along a helical path of decreasing pitch whereby as said pitch decreases said predetermined lengths of sausages become vertically arranged with said clamp locations being said lowermost points.

* * * * *